WILLIAM KLEFFEL.

Improvement in Cultivators.

No. 126,815. Patented May 14, 1872.

Witnesses

Inventor.
William Kleffel
By Attorney
G. B. Towles.

UNITED STATES PATENT OFFICE.

WILLIAM KLEFFEL, OF MAPLE CREEK, NEBRASKA.

IMPROVEMENT IN CULTIVATORS.

Specification forming part of Letters Patent No. 126,815, dated May 14, 1872.

*To all whom it may concern:*

Be it known that I, WILLIAM KLEFFEL, of Maple Creek, in the county of Dodge and State of Nebraska, have invented a new and Improved Cultivator and Harrow combined; and I do hereby declare that the following is a full, clear, and exact description of the construction and operation of the same, reference being had to the accompanying drawing making a part of this specification, in which—

Figure 1:
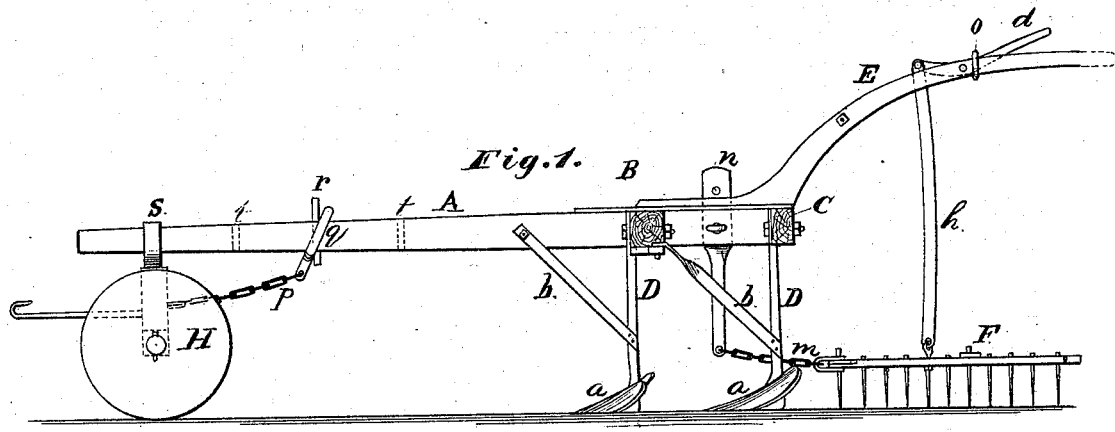
Figure 2:
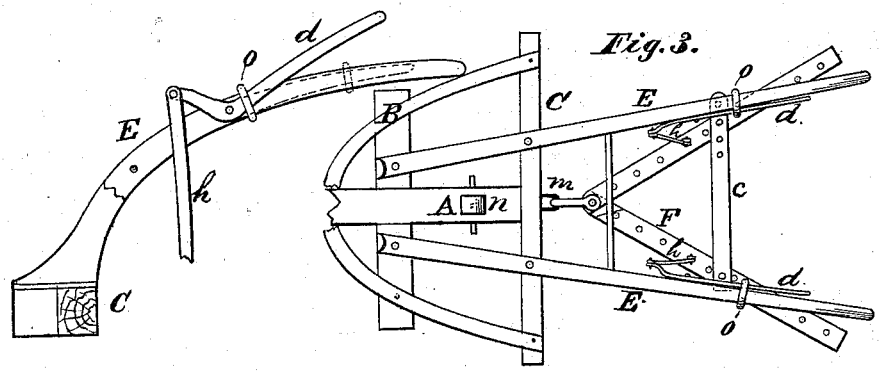
Figure 3:
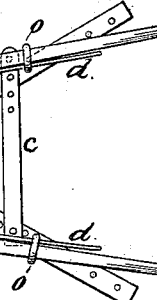

Figure 1 is a side elevation; Fig. 2, a view of cultivator-handle detached, showing devices for connecting it with the harrow; Fig. 3, a plan or top view.

Like letters in the different figures of the drawing indicate like parts.

My invention relates to the combination of a harrow in such a manner with the handles and frame of a cultivator that the operator, while controlling the movement of the cultivator, can also, at the same time, readily control that of the harrow so as to raise or lower it to clear it of obstructions, or cause it to run to a greater or less depth in the soil, as will be hereinafter more fully explained.

The cultivator-frame consists of tongue A with transverse beams B C attached, at suitable distances apart, to its rear end. Standards D, provided with shovels $a$, are attached to the opposite ends of the beams, and strengthened by braces $b$. The rear standards, with their braces, are arranged so that they can be placed wider apart, to suit the width of row to be cultivated. The handles E are attached in any suitable manner to the top of the beams B C. The harrow F is of the ordinary kind, having an adjustable transverse bar, $c$, for increasing or diminishing its width. I arrange the harrow immediately in the rear of the cultivator-frame, and attach two lever-handles, $d\ d$, by pivots, to the inner sides of the cultivator-handles. These handles $d\ d$ are connected by vertical levers $h\ h$ pivoted to their respective front ends, and thence to the beams of the harrow below. I connect the front end of the harrow by a chain, $m$, to an adjustable vertical bar, $n$, provided with a suitable number of holes, and arranged to fit in a slot in the rear end of the tongue A, and secured by a bolt being passed through a hole in the side of the tongue, and thence through a corresponding hole in the bar. This bar is for the purpose of regulating the depth of the harrow, and is readily adjusted by raising or lowering it in the slot and inserting the bolt in the proper hole of the bar.

Thus, it will be seen, the lever-handles $d\ d$, having their fulcrums on the sides of the cultivator-handles, the operator, while controlling the movement of the cultivator, can, at the same time, readily grasp the lever-handles and control that of the harrow so as to raise or lower it to clear it of obstructions or permit it to run with less depth in the soil.

Sliding rings $o$ are placed over both the cultivator and lever handles, so that when slipped back, as seen in dotted lines of Fig. 2, will hold the lever-handles down, and hence elevate the harrow clear of the ground, and retain it in that position as long as circumstances may require. I attach a truck, H, to the forward end of the tongue by a chain, $p$, having a ring, $q$, on its end, arranged to slip over the same. A suitable number of holes, $t$, is made in the tongue; thus, by moving the truck backward or forward, and passing a bolt, $r$, through the proper hole and the ring $q$, as seen in Fig. 1, the truck can be made to regulate the depth of the cultivator. The truck has a swivel-guide, S, on top of the axle, which holds the tongue and allows the truck to turn freely either way.

Having thus fully described my invention, what I claim therein as new, and desire to secure by Letters Patent, is—

1. The combination of harrow F with the cultivator-handles E by means of the lever-handles $d\ d$, and vertical levers $h\ h$, and chain or its equivalent for attaching it to the frame of cultivator, substantially as set forth.

2. The combination of harrow F, lever-handles $d\ d$, vertical levers $h\ h$, cultivator-handles E, sliding rings $o$, and adjustable vertical bar $n$, all arranged to operate substantially as set forth.

3. The truck H, having its axle provided with the swivel-guide S, and chain $p$ with ring $q$ on its end, in combination with the tongue A having holes $t$ and bolt $r$, the whole arranged to operate as shown and set forth.

As evidence that I claim the foregoing as my invention I have hereunto set my hand and seal in the presence of two witnesses.

WILLIAM KLEFFEL. [L. S.]

Witnesses:
ERNEST OSTENBERG,
SILAS H. TUCKER.